US011923625B2

(12) United States Patent
Kim

(10) Patent No.: US 11,923,625 B2
(45) Date of Patent: Mar. 5, 2024

(54) PATCH ANTENNA AND ARRAY ANTENNA COMPRISING SAME

(71) Applicant: ATCODI CO., LTD, Seoul (KR)

(72) Inventor: Jeong Pyo Kim, Suwon-si (KR)

(73) Assignee: ATCODI CO., LTD, Seoul (KR)

( * ) Notice: Subject to any disclaimer, the term of this patent is extended or adjusted under 35 U.S.C. 154(b) by 258 days.

(21) Appl. No.: 17/610,373

(22) PCT Filed: Jun. 10, 2019

(86) PCT No.: PCT/KR2019/006923
§ 371 (c)(1),
(2) Date: Nov. 10, 2021

(87) PCT Pub. No.: WO2020/251064
PCT Pub. Date: Dec. 17, 2020

(65) Prior Publication Data
US 2022/0224012 A1 Jul. 14, 2022

(51) Int. Cl.
*H01Q 9/04* (2006.01)
*H01Q 21/08* (2006.01)

(52) U.S. Cl.
CPC ............. *H01Q 9/045* (2013.01); *H01Q 21/08* (2013.01)

(58) Field of Classification Search
CPC ............................... H01Q 9/045; H01Q 21/08
See application file for complete search history.

(56) References Cited

U.S. PATENT DOCUMENTS 5,400,040 A * 3/1995 Lane ....................... H01Q 1/286 343/822
5,408,241 A * 4/1995 Shattuck, Jr. ........ H01Q 9/0414 343/846
6,049,309 A * 4/2000 Timoshin ............ H01Q 9/0407 343/700 MS
6,087,989 A * 7/2000 Song ...................... H01Q 21/08 343/803

(Continued)

FOREIGN PATENT DOCUMENTS

CN 107134646 A * 9/2017 ............... H01Q 1/38
EP 688040 A2 * 12/1995 ............ H01Q 21/08

(Continued)

OTHER PUBLICATIONS

Agarwal et al., A Novel Reconfigurable patch Antenna with Parasitic Patch, Mar. 2019, 6th International Conference on Signal Processing and Integrated networks (SPIN) (Year: 2019).*

(Continued)

*Primary Examiner* — Ricardo I Magallanes
*Assistant Examiner* — Jordan E. DeWitt
(74) *Attorney, Agent, or Firm* — LRK PATENT LAW FIRM

(57) ABSTRACT

A patch antenna includes: a substrate; a first radiator disposed on the substrate and having a first shape; a second radiator disposed on the substrate while being spaced a predetermined distance apart from the first radiator, and having a second shape; and a power feeder which supplies a power feed signal to the first radiator, wherein the first radiator includes a first outer edge portion straightly formed in the horizontal direction and second outer edge portions vertically formed from both ends of the first outer edge portion.

12 Claims, 7 Drawing Sheets

(56) References Cited

U.S. PATENT DOCUMENTS 6,466,176 B1 * 10/2002 Maoz ........................ H01Q 1/38 343/702
8,063,832 B1 * 11/2011 Weller .................... H01Q 21/08 343/824
8,482,465 B1 * 7/2013 Hemmady ............... H01Q 9/04 333/262
8,761,705 B2 * 6/2014 Ichiki ...................... H01Q 1/523 343/702
10,158,384 B1 * 12/2018 Yarga .................... H04B 1/0458
2005/0110686 A1 * 5/2005 Frederik du Toit . H01Q 19/005 343/770
2006/0208954 A1 * 9/2006 Han ........................ H01Q 13/08 343/700 MS
2007/0013606 A1 * 1/2007 Yang ....................... H01Q 11/08 343/895
2007/0126640 A1 * 6/2007 Lee ......................... H01Q 5/385 343/700 MS
2007/0229366 A1 * 10/2007 Kim .......................... H01Q 9/42 343/846
2007/0290927 A1 * 12/2007 Rowell ................ H01Q 19/005 343/834
2009/0201211 A1 * 8/2009 Saily ....................... H01Q 1/246 343/702
2010/0033382 A1 * 2/2010 Chou ................... H01Q 9/0428 343/700 MS
2010/0045557 A1 * 2/2010 Park ........................ H01Q 13/10 343/843
2010/0090907 A1 * 4/2010 Ko .......................... H01Q 5/357 343/702
2010/0156725 A1 * 6/2010 Legay .................. H01Q 9/0464 343/700 MS
2011/0037673 A1 * 2/2011 Huang ................... H01Q 5/371 343/793
2011/0133991 A1 * 6/2011 Lee ...................... H01Q 9/0485 343/700 MS
2012/0056790 A1 * 3/2012 Lee .......................... H01Q 7/00 343/702
2013/0300611 A1 * 11/2013 Chou ........................ H01Q 1/36 343/700 MS
2016/0043470 A1 * 2/2016 Ko .......................... H01Q 21/28 343/893
2016/0141740 A1 * 5/2016 Natsuhara ................. H01P 5/12 333/239
2016/0233589 A1 * 8/2016 Kim ..................... H01Q 1/3233
2017/0117638 A1 * 4/2017 Kim ........................ H01Q 21/08
2017/0201024 A1 * 7/2017 Park ..................... H01Q 13/206
2017/0214141 A1 * 7/2017 Liu ........................... H01Q 1/48
2017/0324171 A1 * 11/2017 Shehan .................... H01Q 5/30
2018/0191057 A1 * 7/2018 Chen ....................... H01Q 1/243
2019/0006751 A1 * 1/2019 Chen ......................... H04B 7/10
2019/0148839 A1 * 5/2019 Lin ........................ H01Q 21/30 343/700 R
2019/0190562 A1 * 6/2019 Chen ....................... H01Q 9/045
2020/0021010 A1 * 1/2020 Ou ....................... H01Q 21/065
2020/0076083 A1 * 3/2020 Fukunaga ................ H01Q 1/38
2020/0144710 A1 * 5/2020 Ndip .................... H01Q 9/0407
2020/0203836 A1 * 6/2020 Park ........................ H01Q 21/08
2020/0412016 A1 * 12/2020 Shen ...................... H01Q 1/243
2021/0203082 A1 * 7/2021 Oh ....................... H01Q 9/0457
2022/0109239 A1 * 4/2022 Okada ...................... H01Q 9/04
2022/0166149 A1 * 5/2022 So .......................... H01Q 5/307
2022/0190484 A1 * 6/2022 Lee .......................... H01Q 5/42
2022/0247083 A1 * 8/2022 Kim ................... H01Q 21/0075
2022/0255238 A1 * 8/2022 Yu ...................... H01Q 21/0025
2023/0078966 A1 * 3/2023 Pandey .................. H01Q 15/08 343/700 MS
2023/0178882 A1 * 6/2023 Martin Bartrina ..... H01Q 21/20 343/709
2023/0198168 A1 * 6/2023 Sugahara ............... H01Q 21/28 343/702
2023/0253709 A1 * 8/2023 Sakr ..................... H01Q 21/065 343/702

FOREIGN PATENT DOCUMENTS

KR 10-2014-0101657 A 8/2014
KR 10-2015-0070356 A 6/2015
KR 10-2017-0028598 A 3/2017
KR 10-2017-0051046 A 5/2017
WO WO-2020251064 A1 * 12/2020 ............. H01Q 21/08

OTHER PUBLICATIONS

Search Report, dated Mar. 10, 2020, for International Application No. PCT/KR2019/006923.
Written Opinion, dated Mar. 10, 2020, for International Application No. PCT/KR2019/006923.

* cited by examiner

PATCH ANTENNA AND ARRAY ANTENNA COMPRISING SAME

CROSS-REFERENCE TO RELATED APPLICATION

The present application is a U.S. National Phase entry from International Application No. PCT/KR2019/006923, filed on Jun. 10, 2019, the disclosure of which is incorporated by reference herein in its entirety.

TECHNICAL FIELD

The present invention relates to a patch antenna and an array antenna having the same. More particularly, the present invention relates to a patch antenna and an array antenna having the same, which can be used as a radar for a vehicle since having a wide bandwidth and a wide beam width.

BACKGROUND ART

As an autonomous driving age has arrived, various kinds of sensors are mounted on vehicles, and a radar is one of such sensors.

Meanwhile, there are various kinds of radars to be mounted on vehicles. The radars are divided into a long range radar (LRR), a middle range radar (MRR), and a short range radar (SRR). The SRR, more specifically, ultra short range radars (USRRs), are used for corner radars of passenger cars or used on the sides of trucks or buses.

Such USRRs perform a blind spot detection (BSD) function to detect blind spots. Accordingly, the USRRs essentially require wide bandwidth and beam width, and more specifically, require a bandwidth ranging from 77 GHz to 81 GHz and a beam width of more than 150°.

However, the conventional USRRs of a patch antenna form, which use a single radiator (patch), have a limitation in bandwidth to act. Moreover, the conventional USRRs of a patch antenna form, which use a plurality of radiators, have a disadvantage in that it shows insignificant effect in bandwidth expansion since resonance of a main radiator and resonance of a parasitic element adjoin each other to expand a bandwidth. Furthermore, because resonance of the main radiator and resonance of the parasitic element adjoin each other, the beam width is about 100°. So, the conventional USRR is too inadequate to perform the BSD function.

In order to overcome the above disadvantages of the conventional USRR, the present invention relates to an advanced patch antenna and an array antenna having the same, which can provide a wide bandwidth and a wide beam width.

DISCLOSURE

Technical Problem

Accordingly, the present invention has been made in an effort to solve the above-mentioned problems occurring in the prior arts, and it is an object of the present invention to provide a patch antenna and an array antenna having the same, which can perfectly perform a BSD function of an ultra short range radars (USRRs) by showing e a wide bandwidth and a wide beam width.

It is another object of the present invention to provide a patch antenna and an array antenna having the same, which can show a bandwidth ranging from 77 GHz to 81 GHz and a beam width of more than 150° required for the USRR.

Technical objects to be achieved by the present invention are not limited to the above-described objects and other technical objects that have not been described will be evidently understood by those skilled in the art from the following description.

Technical Solution

To achieve the above objects, the present invention provides a patch antenna including: a substrate; a first radiator disposed on the substrate and having a first shape; a second radiator disposed on the substrate, being spaced apart from the first radiator at a predetermined distance, and having a second shape; and a power feeder which supplies a power feed signal to the first radiator, wherein the first radiator includes: a first outer peripheral portion formed straight in the horizontal direction and second outer peripheral portions vertically formed from both ends of the first outer peripheral portion.

According to an embodiment of the present invention, the first shape and the second shape are the same, and the first radiator and the second radiator differ from each other in size.

According to an embodiment of the present invention, the second outer peripheral portion includes: a second-first outer peripheral portion formed straight in the vertical direction; a second-second outer peripheral portion curved at one end of the second-first outer peripheral portion in the central direction of the first radiator; and a second-third outer peripheral portion formed straight at one end of the second-second outer peripheral portion in the horizontal direction.

According to an embodiment of the present invention, the patch antenna further includes a first via and a second via formed in an inner space of the second-second outer peripheral portion.

According to an embodiment of the present invention, the shortest distance between the first outer peripheral portion and the first via and the second via is less than the shortest distance between the first outer peripheral portion and the second-third outer peripheral portion.

According to an embodiment of the present invention, a distance between the center of the first via and the center of the second via is less than $2/\lambda$.

According to an embodiment of the present invention, the power feeder is directly connected with the second-third outer peripheral portion or extends from the second-third outer peripheral portion to supply a power feed signal to the first radiator.

According to an embodiment of the present invention, the first radiator and the second radiator are equal in horizontal length, but differ from each other in vertical length.

According to an embodiment of the present invention, the first radiator operates in a first operating frequency band and is tuned to resonate in the first operating frequency band, and the second radiator operates in a second operating frequency band after the first operating frequency band and is tuned not to resonate in the first operating frequency band and the second operating frequency band.

According to an embodiment of the present invention, the predetermined distance ranges from 0.1 mm to 0.2 mm. According to an embodiment of the present invention, provided is an array antenna including: a plurality of patch antennas; and a common power feeder connected to power feeders of the plurality of patch antennas in order to supply power feed signals to the plurality of power feeders.

Advantageous Effects

The patch antenna and the array antenna having the same according to an embodiment of the present invention can provide both of a wide bandwidth and a wide beam width required for the USRR since adjusting differences in shape and size of the first radiator and the second radiator and a predetermined distance between the first radiator and the second radiator.

Additionally, the patch antenna and the array antenna having the same according to an embodiment of the present invention can show a bandwidth ranging from 77 GHz to 81 GHz and a beam width of more than 150° required for the USRR since a resonance band of the first radiator is expanded, differently from the conventional patch antenna that resonance of the main radiator and resonance of the parasitic element adjoin each other to expand the bandwidth and the beam width.

The effects of the present invention are not limited to the above-mentioned effects and further effects not described above will be clearly understood by those skilled in the art.

MODE FOR INVENTION

Advantages and features of the present invention, and a method to achieve them of the present invention will be obvious with reference to embodiments along with the accompanying drawings which are described below. Meanwhile, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. In the detailed description, the same reference numbers of the drawings refer to the same or equivalent parts of the present invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Terms used in the specification are provided for description of the exemplary embodiments, and the present invention is not limited thereto. In the specification, singulars in sentences include plural unless otherwise noted. It will be understood in the specification that the terms "comprises" and "comprising", when used herein, specify the presence of constituent elements, but do not preclude the presence or addition of other constituent elements.

Figure 1:
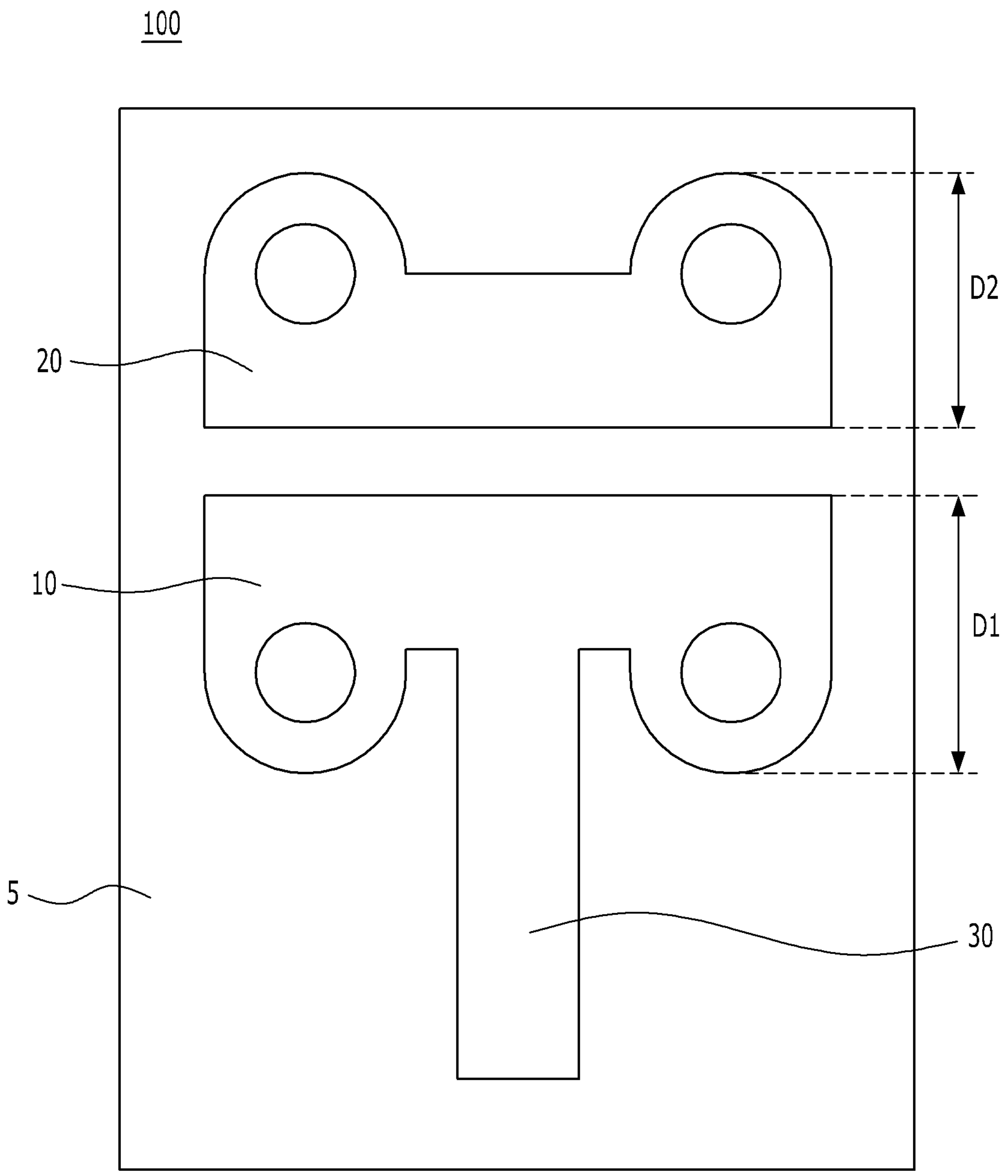
FIG. 1 is a top view of a patch antenna according to a first preferred embodiment of the present invention.
Figure 2:
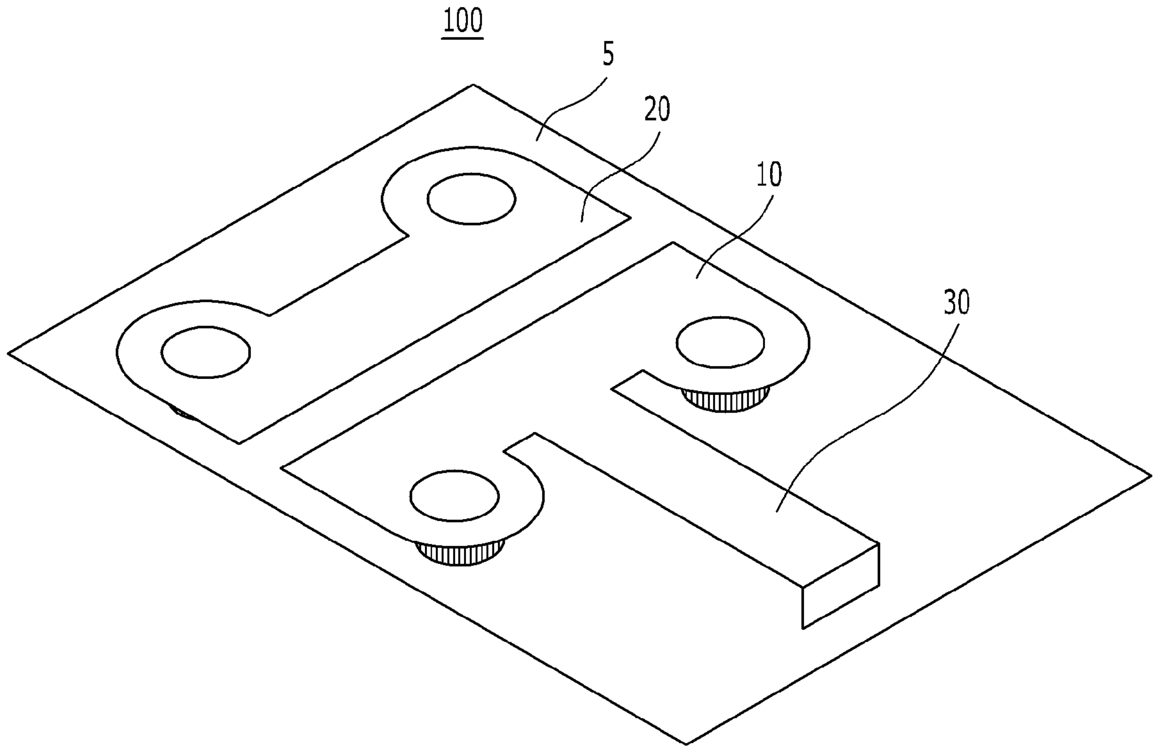
FIG. 2 is a perspective view of the patch antenna according to the first preferred embodiment of the present invention.
Figure 3:
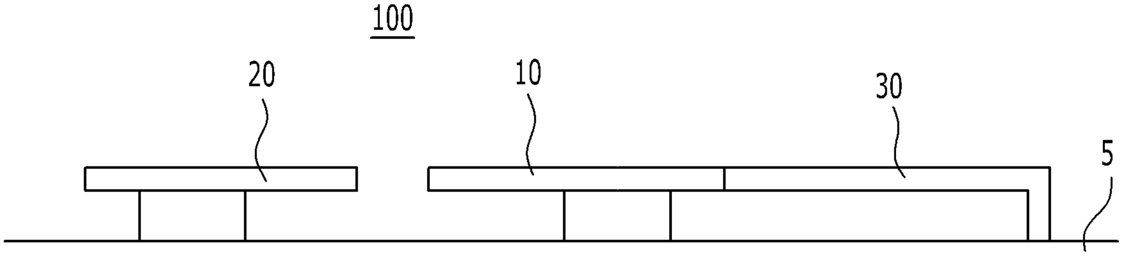
FIG. 3 is a side elevation view of the patch antenna according to the first preferred embodiment of the present invention.

FIG. 1 is a top view of a patch antenna 100 according to a first preferred embodiment of the present invention, FIG. 2 is a perspective view of the patch antenna 100 according to the first preferred embodiment of the present invention, and FIG. 3 is a side elevation view of the patch antenna 100 according to the first preferred embodiment of the present invention.

The patch antenna 100 according to the first preferred embodiment of the present invention includes a substrate 5, a first radiator 10, a second radiator 20, and a power feeder 30. Of course, the present invention can further include general components required for achieving the objects of the present invention.

The substrate 5 may be a general antenna substrate. For instance, the substrate 5 may be one of known antenna substrates, such as a printed circuit board (PCB), or a flexible printed circuit board (F-PCB). Because an area of the substrate is associated with an area of the patch antenna 100, it is not necessary to use an excessively wide substrate in order to miniaturize the antenna. Therefore, it is sufficient that the substrate 5 has an area enough to form the first radiator 10, the second radiator 20, and the power feeder 30 on one side thereof.

The first radiator 10 is made of a conductive material, is arranged on one side of the substrate 5 in a patch form, and has a first shape.

Figure 4:
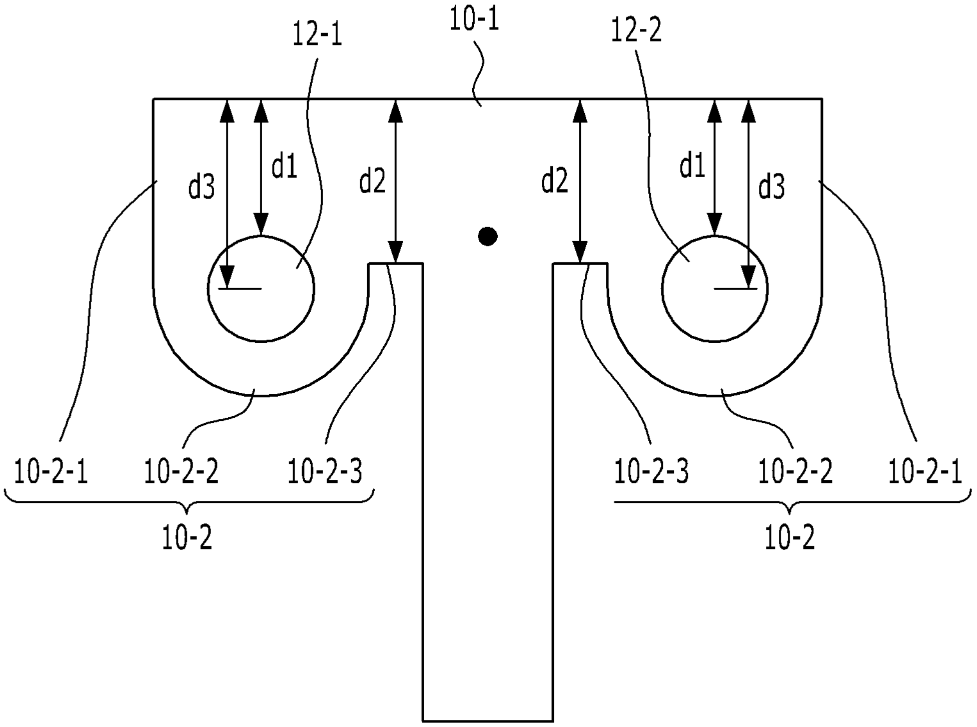
FIG. 4 is a top view of a first radiator.

FIG. 4 is a top view of the first radiator 10. Referring to FIG. 4, the first radiator includes: a first outer peripheral portion 10-1 formed straight in the horizontal direction; and second outer peripheral portions 10-2 formed at both ends of the first outer peripheral portion in the vertical direction. The first outer peripheral portion 10-1 and the second outer peripheral portions 10-2 are formed by areas divided according to the shape of the first radiator 10.

Meanwhile, the two second peripheral portions 10-2 are vertically formed at both sides of the first peripheral portion 10-1 formed straight in the horizontal direction. Alternatively, a part formed at one end of the first peripheral portion 10-1 in the vertical direction may be named a second peripheral portion 10-2, and a part formed at the other end of the first peripheral portion 10-1 in the vertical direction may be named a third outer peripheral portion (not shown), but for convenience of description, all of them will be called the second peripheral portion 10-2 in this description of the present invention.

The first outer peripheral portion 10-1 is formed at the upper end of the first radiator 10 when viewed from the top, and may be formed straight in the horizontal direction to have a predetermined length. Of course, the first outer peripheral portion 10-1 may be formed to have any one of different shapes through antenna tuning to adjust operating frequency band or resonance. For instance, the first peripheral portion 10-1 may be formed in a saw-toothed wheel shape having at least one groove, and in this instance, there is effect of extension of length.

The second outer peripheral portions 10-2 are formed at both ends of the first outer peripheral portion 10-1 in the vertical direction. In more detail, each of the second outer peripheral portions 10-2 includes: a second-first outer peripheral portion 10-2-1 formed straight in the vertical direction; a second-second outer peripheral portion 10-2-2 curved at one end of the second-first outer peripheral portion 10-2-1 in the central direction of the first radiator 10; and a second-third outer peripheral portion 10-2-3 formed straight at one end of the second-second outer peripheral portion 10-2-2 in the horizontal direction.

The second-first outer peripheral portions 10-21-1 are formed at the right and left sides like the first outer peripheral portion 10-1 when viewed from the top, and may be formed straight in the vertical direction to have a predetermined length. Of course, the second-first outer peripheral portions 10-21-1 may be formed to have any one of different shapes through antenna tuning to adjust operating frequency band or resonance. For instance, the second-first outer peripheral portions 10-2-1 may be formed in a saw-toothed wheel shape having at least one groove, and in this instance, there is effect of extension of length.

The second-second outer peripheral portions 10-2-2 are formed to be curved from one end of the second-first outer peripheral portion 10-2-1 in the central direction of the first radiator 10. Here, the central direction of the first radiator 10 is indicated by a dotted line of FIG. 4, and means the direction that the power feeder 30 which will be described later is arranged. In this instance, that the second-second outer peripheral portions 10-2-2 are curved in the central direction of the first radiator 10 means that the second-second outer peripheral portions 10-2-2 are bent inwards. That is, viewed from the top, since the second-second outer peripheral portions 10-2-2 are formed at the left side and the right side, the second-second outer peripheral portion 10-2-2 formed at the left side is bent in the counterclockwise direction, and the second-second outer peripheral portion 10-2-2 formed at the right side is bent in the clockwise direction.

In the meantime, the second-second outer peripheral portions 10-2-2 are bent to have a predetermined curvature. So, if the curvature is large, since the second-second outer peripheral portions 10-2-2 are bent a lot, the second-second outer peripheral portions 10-2-2 get shorter. If the curvature is small, since the second-second outer peripheral portions 10-2-2 are bent less, the second-second outer peripheral portions 10-2-2 get longer. Therefore, it is possible to freely set the curvature of if the curvature is large, since the second-second outer peripheral portions 10-2-2 are bent a lot, the second-second outer peripheral portions 10-2-2 through antenna tuning to adjust operating frequency band or resonance.

A first via 12-1 and a second via 12-2 are formed in an inner space of the first radiator 10 having the second-second outer peripheral portions 10-2-2. The first via 12-1 and a second via 12-2 are connected with the substrate 5 to perform a short circuit.

In this instance, a distance between the center of the first via 12-1 and the center of the second via 12-2 may be less than $2/\lambda$, so that the patch antenna 100 according to the first preferred embodiment of the present invention can show a bandwidth ranging from 77 GHz to 81 GHz and a beam width of more than 150°.

The second-third outer peripheral portion 10-2-3 is formed straight at one end of the second-second outer peripheral portion 10-2-2 in the horizontal direction. Because the second-second outer peripheral portion 10-2-2 is formed based on the horizontal direction, the second-third outer peripheral portion 10-2-3 is shorter than the second-first outer peripheral portion 10-2-1. However, the second-third outer peripheral portions 10-2-3 may be also formed to have any one of different shapes through antenna tuning to adjust operating frequency band or resonance. For instance, the second-third outer peripheral portions 10-2-3 may be formed in a saw-toothed wheel shape having at least one groove, and in this instance, there is effect of extension of length.

Till now, referring to FIG. 4, the shape of the first radiator 10 is described in detail. Hereinafter, referring to FIGS. 1 and 2, the second radiator 20 will be described.

The second radiator 20 is made of a conductive material, is arranged on one side of the substrate 5 in a patch form, and is spaced apart from the first radiator 10 at a predetermined interval to have a second shape.

Here, preferably, the second radiator 20 is made of the same conductive material as the first radiator 10 so as to simplify a manufacturing process, and one side of the substrate 5 is the same as the one side of the substrate 5 on which the first radiator 10 is arranged.

Meanwhile, description of the second radiator 20 is basically the same as the first radiator 10. For instance, the second radiator 20 may includes components corresponding to the first outer peripheral portion 10-1, the second outer peripheral portion 10-2, which has the second-first outer peripheral portion 10-2-1, the second-second outer peripheral portion 10-2-2, and the second-third outer peripheral portion 10-2-3, the first via 112-1, and the second via 12-2 of the first radiator 10. Repeated descriptions of the components of the second radiator 20 will be omitted.

In this instance, since the first radiator 10 and the second radiator 20 have the same shape, the first shape of the first radiator 10 and the second shape of the second radiator 20 are the same. However, because the first radiator 10 and the second radiator 20 are not in symmetric relation, the first radiator 10 and the second radiator 20 may differ from each other in size.

Referring to FIG. 1, a horizontal length of the first radiator 10 and a horizontal length of the second radiator 20 are equal to each other, but a vertical length D1 of the first radiator 10 is longer than a vertical length D2 of the second radiator 20. However, as occasion demands, the vertical length D1 of the first radiator 10 is more than the vertical length D2 of the second radiator 20. Therefore, the first radiator 10 and the second radiator 20 may differ from each other in size, vertical length, and area.

Meanwhile, the predetermined interval between the first radiator 10 and the second radiator 20 may be a slot ranging from 0.1 mm to 0.2 mm to perform antenna tuning to adjust operating frequency band or resonance.

The second radiator 20 is not directly supplied with a power feed signal for operation from a power feeder, but may be supplied with a power feed signal, which has been supplied to the first radiator 10 by the power feeder 30, through electromagnetic coupling. In this instance, the power feed signal supplied to the first radiator 10 by the power feeder 30 is supplied to the second radiator 20 after passing the predetermined interval.

On the other hand, the second radiator 20 serves as a parasitic element in relationship with the first radiator 10, and it is a matter related with the operating frequency band and resonance, and will be described referring to FIGS. 6 and 7 in detail.

The power feeder 30 supplies a power feed signal to the first radiator 10.

Here, the power feeder 30 is directly connected with the second-third outer peripheral portion 10-2-3 of the first radiator 10, or is formed integrally with the first radiator 10 to extend from the second-third outer peripheral portion 10-2-3.

As described above, the power feeder 30 directly supplies the power feed signal to the first radiator 10, and the power feed signal supplied to the first radiator is supplied to the second radiator 20 through the electromagnetic coupling.

Till now, the configuration of the patch antenna 100 according to the first preferred embodiment of the present invention is described. According to the present invention, the patch antenna 100 can show wide bandwidth and beam width according to the shapes of the first radiator 10 and the second radiator 20, a difference in size between the first radiator 10 and the second radiator 20, and a distance between the first radiator 10 and the second radiator 20 so as to perfectly perform the BSD function of the USRR. Hereinafter, simulation results on characteristics in bandwidth and beam width will be described in detail.

Figure 5:
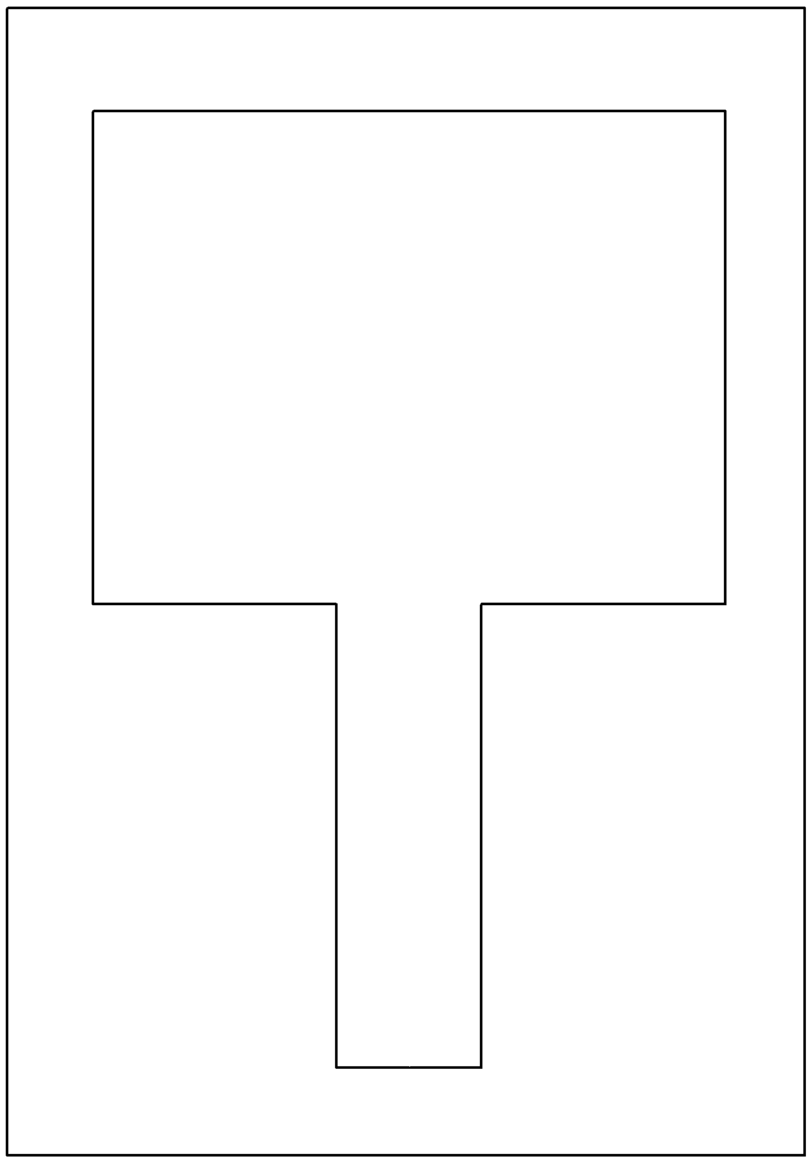
FIG. 5 is a top view illustrating an example of a conventional patch antenna using a single radiator.
Figure 6:
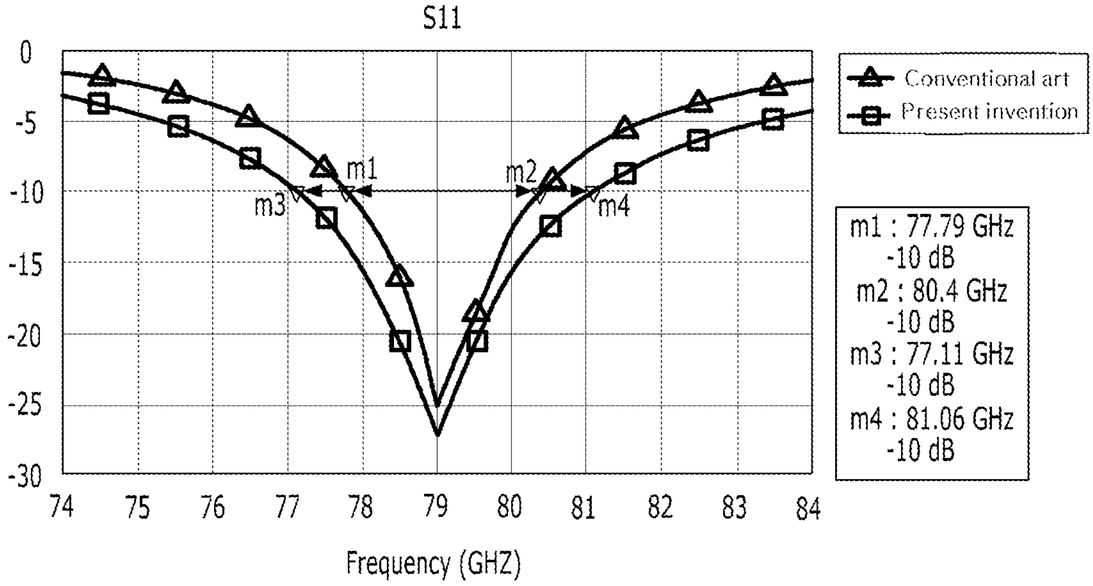
FIG. 6 is a graph showing a simulation result for band characteristics of the conventional patch antenna illustrated in FIG. 5 and the patch antenna according to the first preferred embodiment of the present invention.
Figure 7:
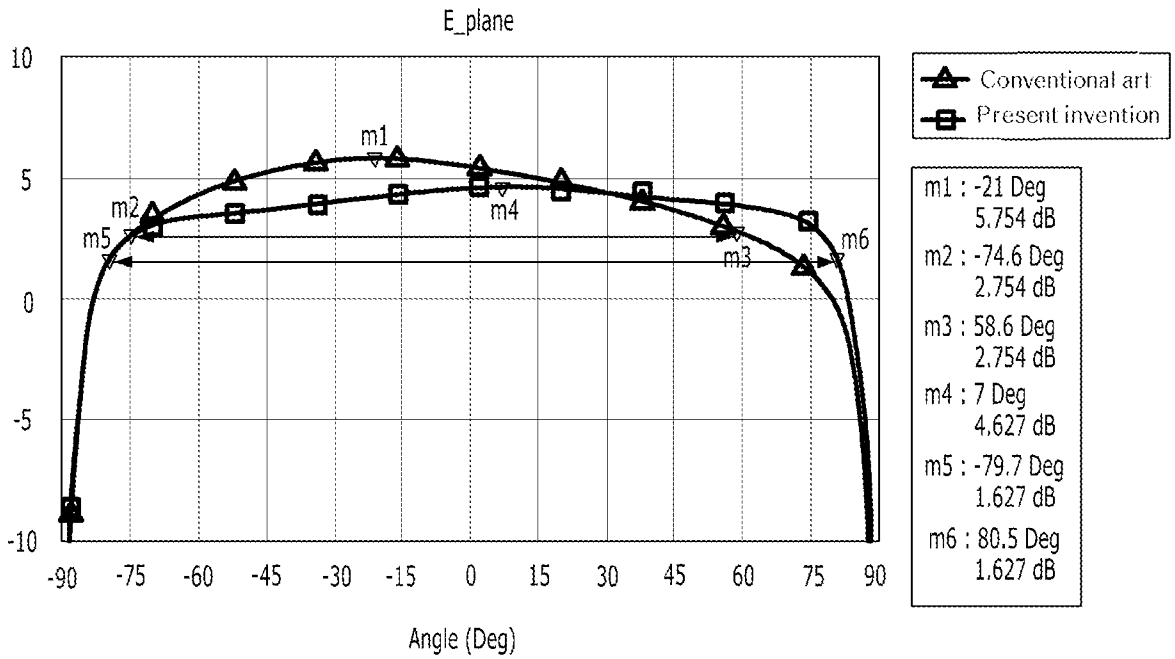
FIG. 7 is a graph showing a simulation result for beam widths of the conventional patch antenna illustrated in FIG. 5 and the patch antenna according to the first preferred embodiment of the present invention.

FIG. 5 is a top view illustrating an example of a conventional patch antenna using a single radiator, FIG. 6 is a graph showing a simulation result for band characteristics of the conventional patch antenna illustrated in FIG. 5 and the patch antenna according to the first preferred embodiment of the present invention, and FIG. 7 is a graph showing a simulation result for beam widths of the conventional patch antenna illustrated in FIG. 5 and the patch antenna according to the first preferred embodiment of the present invention. In FIGS. 6 and 7, parts marked with □ indicate the simulation result of the patch antenna 100 according to the first preferred embodiment of the present invention, and parts marked with A indicate the simulation result of the conventional patch antenna. A detailed description of the conventional patch antenna illustrated in FIG. 5 will be omitted since the conventional patch antenna corresponds to known technology.

Referring to FIG. 6, the bandwidth of the convention patch antenna illustrated in FIG. 5 ranges from 77.79 GHz to 80.4 GHz corresponding to m1 to m2, and the bandwidth of the patch antenna 100 according to the first preferred embodiment of the present invention ranges from 77.11 GHz to 81.06 GHz corresponding to m3 to m4. It is confirmed that the bandwidth of the patch antenna 100 according to the first preferred embodiment of the present invention is wider than that of the conventional patch antenna illustrated in FIG. 5.

In this instance, because the bandwidth of the convention patch antenna illustrated in FIG. 5 ranges from 77.79 GHz to 80.4 GHz, the conventional patch antenna needs 0.79 GHz more in a zone of less than 77.79 GHz, and 0.6 GHz more in a zone of more than 08.4 GHz for covering the bandwidth, ranging from 77 GHz to 81 GHz, required for the USRR.

However, the bandwidth of the patch antenna 100 according to the first preferred embodiment of the present invention ranges from 77.11 GHz to 81.06 GHz. So, the patch antenna 100 according to the first preferred embodiment of the present invention provides a sufficient bandwidth in the zone of more than 81.06 GHz but is 0.11 GHz less in the zone of less than 77.11 GHz, but it is a value which is negligible. Finally, the patch antenna 100 according to the first preferred embodiment of the present invention can show a wide bandwidth which can wholly cover the bandwidth, 77 to 81 GHz required for the USRR.

Referring to FIG. 7, the beam width of the conventional patch antenna illustrated in FIG. 5 is 133.2° corresponding to m2 to m3, and the beam width of the patch antenna 100 according to the first preferred embodiment of the present invention is 160.2° corresponding to m5 to m6. So, the beam width of the patch antenna 100 according to the first preferred embodiment of the present invention is wider than the beam width of the conventional patch antenna illustrated in FIG. 5.

In this instance, since the beam width of the conventional patch antenna illustrated in FIG. 5 is 133.2°, the conventional patch antenna is 16.8° less for covering the beam width, 150°, required for the USRR.

However, because the beam width of the patch antenna 100 according to the first preferred embodiment of the present invention is 160.2°, the patch antenna 100 according to the first preferred embodiment of the present invention can fully cover the beam width, 150°, required for the USRR.

As described above, the patch antenna 100 according to the first preferred embodiment of the present invention can all of the bandwidth and the beam width required for the USRR. The first radiator 10 operates in a first operating frequency band and is tuned to resonate in the first operating frequency band, and the second radiator 20 operates in a second operating frequency band after the first operating frequency band and is tuned not to resonate in the first operating frequency band and the second operating frequency band. Here, a detailed tuning of the first radiator 10 and the second radiator 20 is achieved by adjusting the shapes of the first radiator 10 and the second radiator 20, a difference in size between the first radiator 10 and the second radiator 20, and a distance between the first radiator 10 and the second radiator 20. So, the above is technical characteristics of the patch antenna 100 according to the first preferred embodiment of the present invention. Moreover, the conventional patch antenna expands the bandwidth and the beam width by adjoining resonance of the main radiator and resonance of the parasitic element with each other, but the patch antenna 100 according to the first preferred embodiment of the present invention shows advanced and new technical characteristics since expanding one resonant band according to one main radiator (the first radiator).

Figure 8:
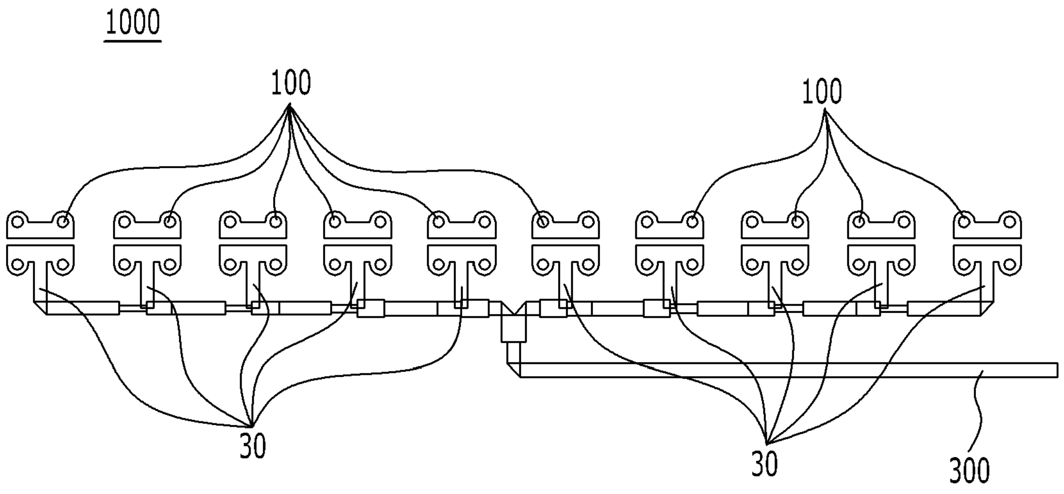
FIG. 8 is a top view of an array antenna according to a second preferred embodiment of the present invention.

FIG. 8 is a top view of an array antenna 1000 according to a second preferred embodiment of the present invention.

The array antenna 1000 according to the second preferred embodiment of the present invention includes a plurality of patch antennas 100 and a common power feeder 300. Of course, the present invention can further include general components required for achieving the objects of the present invention.

The plurality of patch antennas 100 are the patch antennas 100 according to the first preferred embodiment of the present invention, and repeated descriptions of the patch antennas 100 will be omitted.

The common power feeder 300 is connected with the power feeders 30 included in the patch antennas 100 according to the first preferred embodiment to supply power feed signals. Therefore, power feed signals are directly supplied to the power feeders 30, and as described above, the power feed signals supplied to the power feeders 30 can be supplied to the second radiator 20.

While the exemplary embodiments of the present invention have been described in more detail with reference to the accompanying drawings, it will be understood by those of ordinary skill in the art that the present invention can be implemented as other concrete forms without changing the inventive concept or essential features. Therefore, these embodiments as described above are only proposed for illustrative purposes and do not limit the present invention.

The invention claimed is:

1. A patch antenna comprising:

a substrate;

a first radiator disposed on the substrate and having a first shape;

a second radiator disposed on the substrate, being spaced apart from the first radiator at a predetermined distance, and having a second shape; and a power feeder which supplies a power feed signal to the first radiator, wherein the first radiator includes:

a first outer peripheral portion formed straight in the horizontal direction and second outer peripheral portions vertically formed from both ends of the first outer peripheral portion, wherein the second outer peripheral portion includes:

a second-first outer peripheral portion formed straight in the vertical direction;

a second-second outer peripheral portion curved at one end of the second-first outer peripheral portion in the central direction of the first radiator; and a second-third outer peripheral portion formed straight at one end of the second-second outer peripheral portion in the horizontal direction, wherein a first via and a second via are formed in an inner space of the second-second outer peripheral portion.

2. The patch antenna according to claim 1, wherein:

the first shape and the second shape are the same, and the first radiator and the second radiator differ from each other in size.

3. The patch antenna according to claim 1, wherein the shortest distance between the first outer peripheral portion and the first via and the second via is less than the shortest distance between the first outer peripheral portion and the second-third outer peripheral portion.

4. The patch antenna according to claim 1, wherein a distance between the center of the first via and the center of the second via is less than 2/λ.

5. The patch antenna according to claim 1, wherein the power feeder is directly connected with the second-third outer peripheral portion or extends from the second-third outer peripheral portion to supply a power feed signal to the first radiator.

6. The patch antenna according to claim 1, wherein the first radiator and the second radiator are equal in horizontal length, but differ from each other in vertical length.

7. The patch antenna according to claim 1, wherein:

the first radiator operates in a first operating frequency band and is tuned to resonate in the first operating frequency band, and the second radiator operates in a second operating frequency band after the first operating frequency band and is tuned not to resonate in the first operating frequency band and the second operating frequency band.

8. The patch antenna according to claim 1, wherein the predetermined distance ranges from 0.1 mm to 0.2 mm.

9. An array antenna comprising:

a plurality of patch antennas according to claim 1; and a common power feeder connected to power feeders of the plurality of patch antennas in order to supply power feed signals to the plurality of power feeders.

10. The patch antenna according to claim 3, wherein the first radiator and the second radiator are equal in horizontal length, but differ from each other in vertical length.

11. The patch antenna according to claim 4, wherein the first radiator and the second radiator are equal in horizontal length, but differ from each other in vertical length.

12. The patch antenna according to claim 5, wherein the first radiator and the second radiator are equal in horizontal length, but differ from each other in vertical length.

* * * * *